US011476675B2

(12) United States Patent
Jackson et al.

(10) Patent No.: US 11,476,675 B2
(45) Date of Patent: Oct. 18, 2022

(54) MULTIPLE POWER SOURCE UNIT

(71) Applicant: Green Light Industries, Inc., West Chicago, IL (US)

(72) Inventors: Gerald Peter Jackson, Lisle, IL (US); Thomas J. Phillips, Chapel Hill, NC (US); Joseph M. Zlotnicki, Downers Grove, IL (US)

(73) Assignee: Green Light Industries, Inc., West Chicago, IL (US)

( * ) Notice: Subject to any disclaimer, the term of this patent is extended or adjusted under 35 U.S.C. 154(b) by 1449 days.

(21) Appl. No.: 15/137,585

(22) Filed: Apr. 25, 2016

(65) Prior Publication Data

US 2016/0268807 A1 Sep. 15, 2016

Related U.S. Application Data

(63) Continuation of application No. 13/595,062, filed on Aug. 27, 2012, now Pat. No. 9,323,299.

(51) Int. Cl.
*H02J 3/38* (2006.01)
*G06F 1/26* (2006.01)
*H02M 7/44* (2006.01)

(52) U.S. Cl.
CPC ............... *H02J 3/383* (2013.01); *G06F 1/26* (2013.01); *G06F 1/263* (2013.01); *H02J 3/387* (2013.01); *H02M 7/44* (2013.01); *Y02B 10/10* (2013.01)

(58) Field of Classification Search
CPC .. H02J 3/38; H02J 3/383; H02J 3/387; H02M 7/44; G06F 1/263; G06F 1/26; Y02B 10/10; Y02E 10/56
See application file for complete search history.

(56) References Cited

U.S. PATENT DOCUMENTS 9,323,299 B2    4/2016  Jackson et al.
2003/0066290 A1 4/2003  Murata et al.
(Continued)

FOREIGN PATENT DOCUMENTS

EP    0139434 A2    5/1985
EP    1179855 A1    2/2002
(Continued)

OTHER PUBLICATIONS

International Preliminary Examining Authority. PCT International Preliminary Report on Patentability for International Application No. PCT/IB13/01939, dated Feb. 4, 2015. pp. 1-37.
(Continued)

*Primary Examiner* — Tejal Gami
(74) *Attorney, Agent, or Firm* — Peter K. Trzyna, Esq.

(57) ABSTRACT

A power unit including multiple generators supplies power to a load or loads that may be variable. The generators can differ, e.g., in generating capacities, rates at which their outputs can be changed, maintenance requirements, and/or different energy-conversion efficiencies. A control unit throttles the generators independently according to a digitally implemented algorithm that may, but need not, use the difference(s) in supplying power to the load. In some cases, the controller regulates monitored power delivered to the load or loads. A power combiner is connected to the outputs of the generators. If desired, a buffer can be used between the generators and the load or loads to provide energy storage that can allow for the load or loads to change at a faster rate than the generators are throttled and for peak loads that temporarily exceed the capacity of the generators.

40 Claims, 8 Drawing Sheets

(56) References Cited

U.S. PATENT DOCUMENTS

| | | | |
|---|---|---|---|
| 2008/0245407 A1* | 10/2008 | Jackson | H02S 10/30 136/253 |
| 2010/0042860 A1 | 2/2010 | Kwon et al. | |
| 2012/0151240 A1 | 6/2012 | Robinson et al. | |

FOREIGN PATENT DOCUMENTS

| | | |
|---|---|---|
| IN | 1733CHENP2015 A | 1/2016 |
| WO | WO2014033531 A2 | 3/2014 |

OTHER PUBLICATIONS

European Patent Office. Office Action. Application No. 13833855.3. 80298 Munich, Germany, dated Sep. 5, 2016. pp. 1-1.

European Patent Office. European Search Report. Application No. 13833855.3. 80298 Munich, Germany, dated Apr. 20, 2016. pp. 1-12.

Woo et. al. "PEM full cell current regulation by fuel feed control" Chemical Engineering Science, Oxford, GB, vol. 62, No. 4, Jan. 4, 2007, pp. 957-968. XP005822337, ISSN: 0009-2509. DOI 10.1016/J.CES.2006.10.027.

The Patent Office of the People's Republic of China "The First Office Action" dated Nov. 9, 2016. Application No. 201380055773.3. Green Light Industries, Inc. pp. 1-17.

The Patent Office of the People's Republic of China "The Second Office Action with text of English Translation" dated Jul. 5, 2017. Application No. 201380055773.3. Green Light Industries, Inc. pp. 1-10.

European Patent Office "Communication Pursuant to Article 94(3) EPC" Application No. 13833855.3-1879. Green Light Industries, Inc. dated May 24, 2017. pp. 1-9.

\* cited by examiner

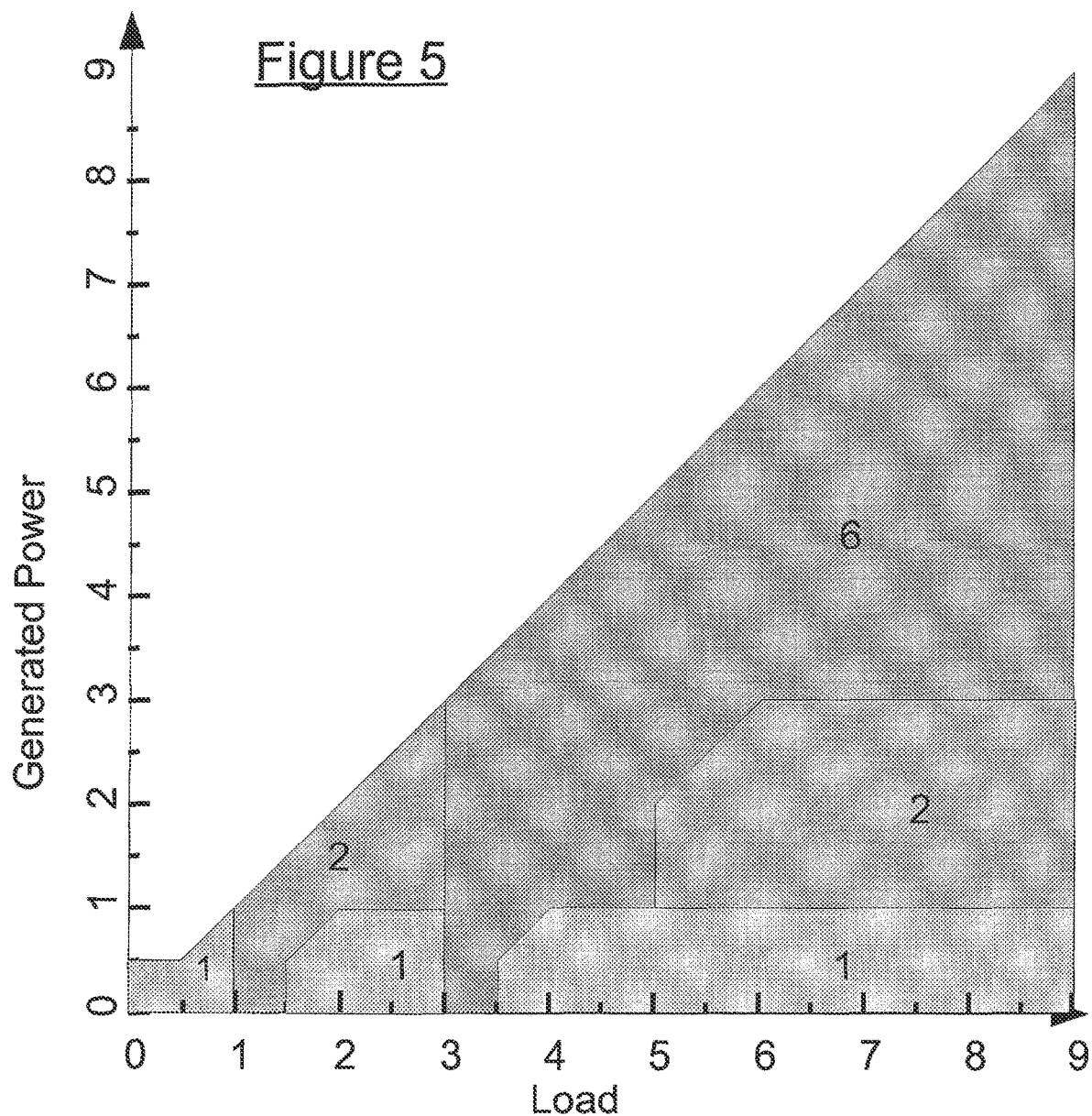

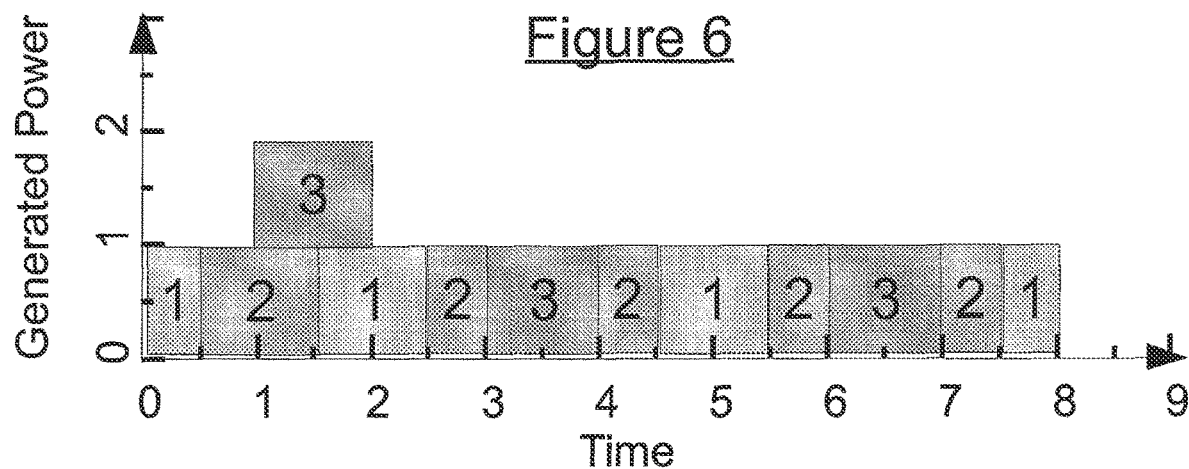
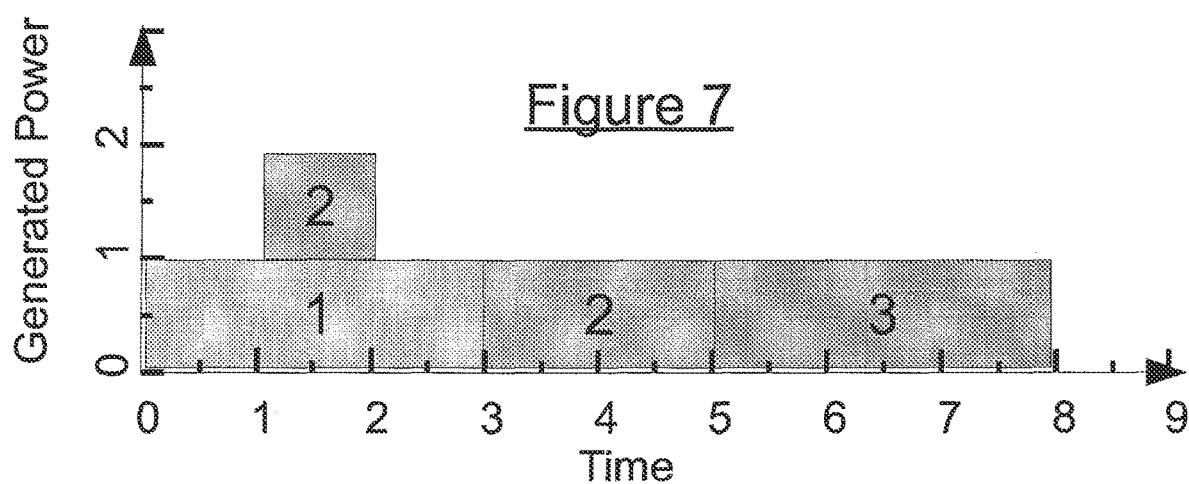

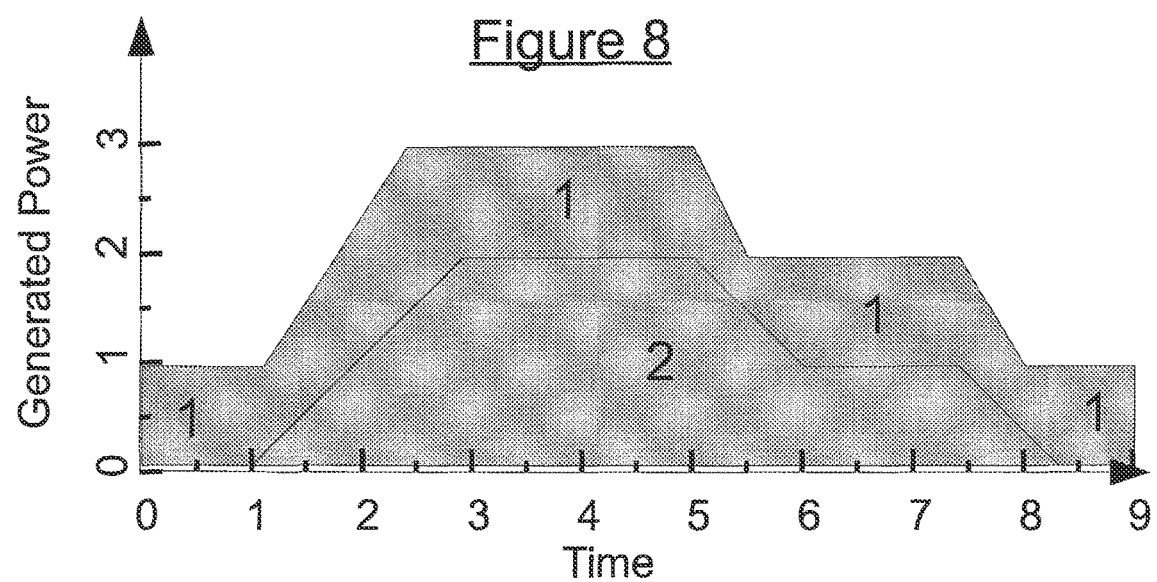

MULTIPLE POWER SOURCE UNIT

PRIORITY STATEMENT

The present patent application is a continuation of U.S. patent application Ser. No. 13/595,062, filed Aug. 27, 2012, pending, being incorporated by reference completely as if restated totally herein.

TECHNICAL FIELD

The technical field includes machine, manufacture, article, process, and product produced thereby, as well as necessary intermediates, which in some cases, pertains to power sources, units thereof, etc.

SUMMARY

Depending on the implementation, there is a machine, article of manufacture, method for use and method for making, and corresponding products produced thereby, as well as necessary intermediates, regarding power sources, units thereof, etc.

BRIEF DESCRIPTION OF THE DRAWINGS

FIG. 5 illustrates an algorithm for an embodiment with three generators, each of which can be throttled to half of the generator's capacity, wherein the generators with smaller capacity have lower operating costs.

FIG. 6 illustrates an algorithm for an embodiment with three generators, wherein all the generators have similar operating times so that the generators can be maintained at the same time.

FIG. 7 illustrates an algorithm for an embodiment with three generators, wherein the generators are operated so that only one of the generators reaches the one generator's maintenance life at a time.

FIG. 8 illustrates an algorithm for an embodiment with at least two generators that can vary their output with different time constants.

MODES

Figure 1:
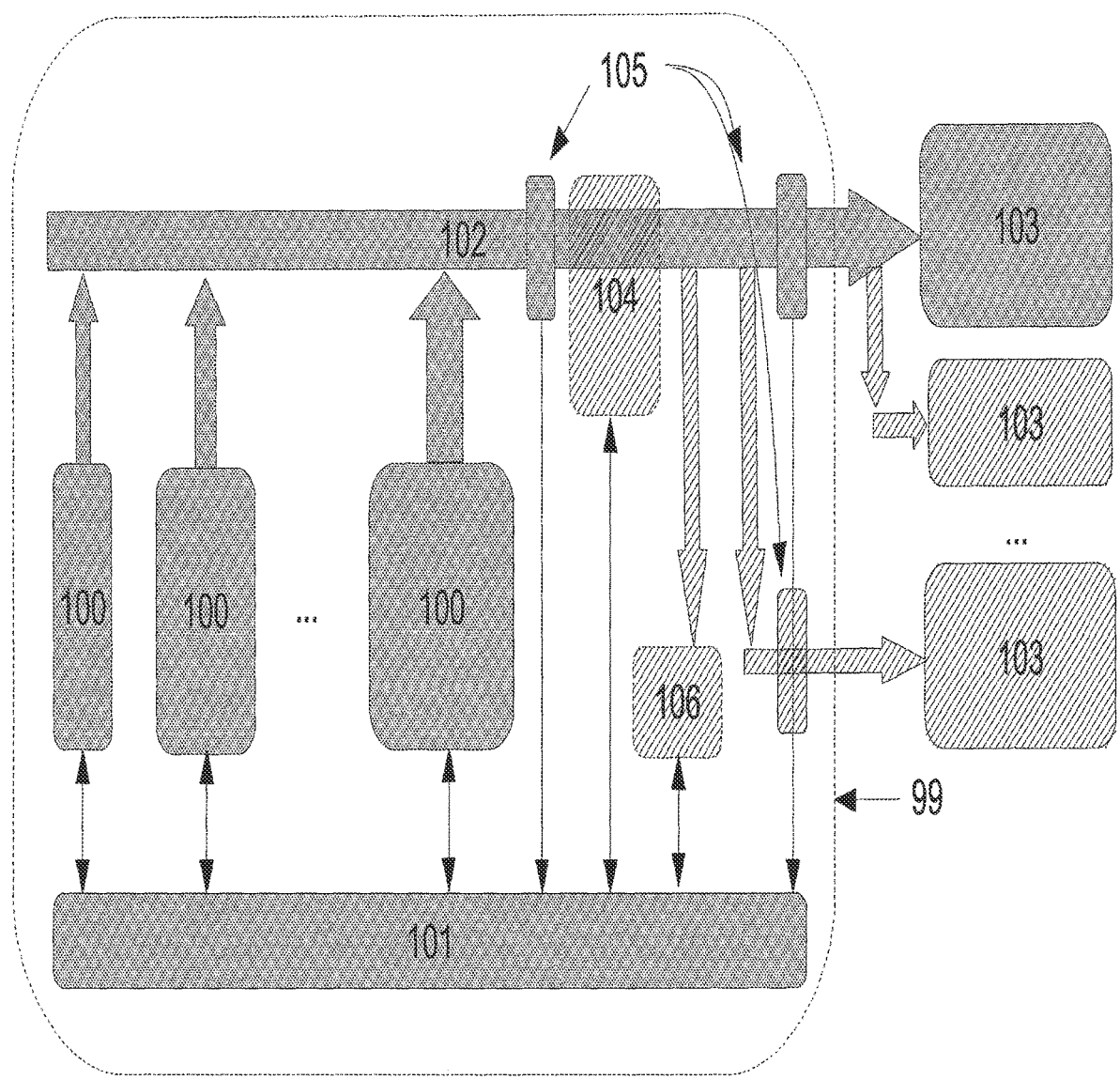
FIG. 1 is a block diagram representing an embodiment.

Generally, embodiments herein are directed to one or more units including a plurality of power sources, such as generators, that can be joined or interconnected together so as to work cooperatively to combine the power sources in a single and complete manner, as discussed subsequently herein. Thus, illustratively, an implementation of a unit using generators as the power sources may include at least two generators, three generators, four generators, etc. The generators can be joined physically e.g., within a housing of the unit, or electrically, or otherwise as may be preferred in one implementation or another.

At least two of the plurality of generators may have at least one difference, e.g., a difference in generating capacity, response time constant, and/or energy-conversion efficiency, such that the unit operates to combine generators by taking the difference(s) into account. For example, the generators can have unique capacities, and in some embodiments, the unit can take into account the ratio of the capacities. For example, a ratio of the capacities between at least any two generators of different capacity can, but need not, be greater than or equal to a factor of 1.5; and the unit can take this ratio into account in cooperatively combining the generators. Some implementations can utilize binary capacities (1, 2, 4, 8, 16 . . . ) when taking the difference(s) into account.

In general, a generator is an apparatus or article of manufacture that converts one type of energy into another. The generators may, but need not, use the same energy source, such as the same fuel as the energy source. There are a number of types of energy that can be used as the energy source for a generator: chemical, nuclear, gravitational potential, kinetic, thermal, electromagnetic fields (both static and propagating waves). Some energy sources can be a combination of these, e.g., ocean waves are a combination of kinetic and gravitational. Energy sources can directly convert one type of energy to another, or do so indirectly. An example is a typical power plant which directly converts either chemical or nuclear energy first into thermal energy and then directly converts the thermal energy into mechanical energy and finally directly converts the mechanical energy into electrical energy, thereby indirectly converting chemical or nuclear energy into electrical energy via three direct converting steps. Another example is a hydroelectric plant that directly converts gravitational potential energy into mechanical energy and then directly converts the mechanical energy into electrical energy, thereby indirectly converting gravitational potential energy into electrical energy. In contrast to indirectly converting systems, thermoelectric generators go directly from thermal energy to electrical energy, and fuel cells go directly from chemical energy to electrical energy, though some may directly use thermal energy as well. Embodiments herein can include or be devoid of one or more of the energy sources, and can include or be devoid of direct or indirect converting, depending in the implementation preferred for a particular application. In some but not all embodiments, the power sources can use the same energy source. In some, but not all, embodiments, there can be master and slave generators.

A unit can include a controller that throttles these generators to match a common load or loads that can, but need not always, vary. For generators that can be throttled to less than their full generating capacity, the generating capacity of each generator with similar energy-conversion efficiency may, but need not, be chosen so that the sum of the generating capacities of all the generators with smaller generating capacity will be equal to the lower end of said generator's dynamic range. This implementation will allow the set of generators to match any load between the lowest non-zero throttled capacity of the smallest generator to the sum of the capacities of all the generators. For loads less than the sum of the capacities of all the generators, the controller can operate according to an algorithm to select which generators are throttled to less than full capacity, which may include fully throttled (i.e., turned off).

The controller can, for example, throttle generators by limiting the amount of energy source available to the generators, by sending an electronic signal to the generator that causes the generator to turn on, turn off, or to turn on to a level less than its full capacity, etc.

The outputs of the generators are combined by a power combiner. Optionally, one or more buffers can be included between the generators and the load, for example, so as to impart the ability to vary the load faster than the generators are throttled, and the ability to temporarily meet peak loads that exceed the net generating capacity of the unit. Examples of buffers include, but are not limited to: capacitors, inductors, batteries, compressed gas, elevated masses such as water pumped between higher and lower reservoirs, reversible chemical processes such as are used in certain fuel cells, heat storage, and flywheels connected to motor-generators. In some embodiments, the controller can receive input information from the buffer and/or send control signals to the buffer.

The power combiner can communicate the power from the generators to a load or loads, which in some cases, can vary. A load can be of one or more types of loads: an electrical load, a chemical load, a mechanical load, and/or a thermal load. An electrical load can, for example, be the electrical utility grid, lighting, electrical equipment (computers, communications devices, etc.), charging (batteries; capacitors; magnets), transmitting (radio, etc) etc. A chemical load can, for example, be oil or aluminum refining, etc. A thermal load can, for example, be a heating, cooling, or melting device. A mechanical load can, for example, be a motor, audio speakers, transportation, lifting, modifying material (digging; drilling, pumping against gravity (water uphill), against friction (e.g., in a pipeline), compressing gas (e.g., in an air conditioner's compressor), etc. A load can be direct, as in directly providing electrical power from the combiner to the electrical utility grid, and a load can be indirect, as in providing the electrical power from the combiner to a home via the electrical utility grid. Some loads fall into several types such as air conditioner compressors being under mechanical (pumping) and thermal.

Some generators have a limited dynamic range of power output, or are most efficient over a limited dynamic range. In an extreme case, a generator can only be throttled by turning the generator on or off with no intermediate power output available. Generators can also vary in efficiency and in their time constant for changing their output power. In some embodiments, the unit herein discussed can be adapted to use such generators with loads that vary more than the efficient dynamic range of one or two such generators, or with loads that change faster than some of the generators can respond.

High-efficiency versions of some generators (generators that produce more power when consuming a given amount of fuel) are more expensive to produce than lower-efficiency versions. An example (at today's prices) is a generator comprised of a hot emitter and photovoltaic cells that convert the emitted radiation into electric power, where higher efficiency photovoltaic cells can be more expensive than lower-efficiency photovoltaic cells. With regard to a generator comprised of a hot emitter and one or more photovoltaic cells that convert the emitted radiation into electric power, a non-limiting example is disclosed in Ser. Nos. 60/833,335; 60/900,866; 11/828,311, and 12/375,176, all of which are incorporated by reference as if fully restated herein. Such generators can be made with different generating capacities, different efficiencies, different abilities to efficiently throttle to less than full capacity, and/or different response time constants. This (and other implementations herein) allows the unit herein discussed to be optimized differently for different applications. For example, it can be more cost effective to have a unit comprised of some high-efficiency generators to produce power for typical loads and lower-cost, lower-efficiency generators to meet peak load demands, provided that the duty factor for the low-efficiency generators is sufficiently low. In some embodiments, the unit herein discussed can be adapted to use such generators with loads that need a peak power substantially above the typical power requirement. An example of a peak load that could be met with this type of power unit would be the load of a vehicle climbing a long hill or a mountain.

The speed at which a generator can be turned on, off, or throttled from one output to another can vary significantly depending upon the generator's design and construction. It is possible that a generator with the ability to turn on quickly and to respond quickly to a throttling signal is more expensive to produce and/or operate than a generator with a slower time constant. In some embodiments, the unit herein discussed can be adapted to use a combination of such generators cooperatively, operating together as a single unit. Examples of applications that have widely varying loads include powering a building such as a home and powering a vehicle.

Maintenance can be an important consideration in determining which generators to operate in a multiple-generator unit. For example, it might be important to ensure that no more than a certain fraction of the generating capacity is due for maintenance at any given time, or it could be important that all generators are maintained at the same time. In units with non-identical generators, some generators might be more costly to maintain than others, so it would be advantageous to have a higher duty cycle for the less-costly generators than for the more-costly generators. In some embodiments, the unit herein discussed can be adapted to run a combination of such generators to address this problem.

In some embodiments of the unit, at least some of the generators (and indeed the units themselves) can be structured to be modular and interchangeable with other modularly structured generators (units). Thus, some embodiments can have mountings configured to accommodate the interchangeability. For example, a generator can be slid into a location with a mounting that guides the unit into position by accommodating the modularity of the generator. If desired, the generator can be engaged by a plug-in connection; jaws or a brace or other securing mechanism be used to secure the generator in the position. In some cases, a spring or other biasing device can be used in locating the generator in position. Some implementations can use a securing means that is securable and releasable without need of using a tool, for example, using one or more bolts with a corresponding wing nut and lock washer, etc. Other interchangeability approaches include snap in, clip in, and twist in embodiments. Depending on the desired implementation, the unit can thusly provide essentially the same or different characteristics from a set of interchangeable generators. The generators can be arranged to be independently throttled, connected, disconnected from the machine, or exchanged for another generator, thereby either changing or maintaining the generating capacity of the unit, e.g., so as to allow an exchanged out generator to be serviced while other generator modules are operating. Alternative applications are where the addition or subtraction of the output of a single module to the output of the machine (1) does or (2) does not result in a material change in the balance between the power generated by the machine and the load. As in other embodiments, a power combiner combines the output of the generators, and a controller throttles the generators, e.g., to match a variable load.

So to exemplify, a hybrid vehicle power system can include interchangeable power (i.e., generator) modules and a controller, with the power modules being capable of generating electrical power, storing electrical power, storing fuel, or any combination of these. Example power modules include ultra capacitors, batteries, fuel cells, hot emitter cells (i.e., as incorporated by reference), motor-generators, and fuel containers. Via the modularity, and receptive configuration to accept swapping the modules, one can swap discharged batteries for charged batteries, as well as to reconfigure a system to optimize it for different primary purposes (e.g., short commutes vs. long commutes vs. road trips vs. extra generating capacity for towing or climbing mountains. Such modules can be incorporated in a leasing (or the equivalent) system to make swapping easier, and/or there can be a trade-in value which includes the remaining charge and/or cycle count, etc., and computer-support for carrying out this operation.

In some embodiments, there can be a measurement of the power leaving the buffer and the power entering the buffer, so that the controller would keep the buffer charged. In other embodiments, there can be monitoring the output voltage and regulating the voltage. Another embodiment is to have the load or loads communicate with the controller. Yet another approach is for the controller to monitor the load or loads so that the controller anticipates the need for power. For example, the unit can be configured to monitor the temperature of a refrigerator to anticipate when the compressor would turn on.

Depending on the configuration, the unit can use an indication or respective indications of the monitored power (in the algorithm) to regulate or match the monitored power to the load or loads. That is, a power monitor or sensor (or for each, a plurality thereof) measures how much power the unit is supplying and matches or regulates the power delivered to the load or loads. For example, consider that the load is a light bulb. The bulb is rated for a particular power. If the unit is not supplying enough power, the voltage of the output will drop below the desired voltage, and the controller would throttle up the generator(s). So a sensor on the output can be used for measuring the actual power delivered. In the case of a buffer, the controller throttles the generators to match this and keep the buffer charged. At any moment, depending on the desired configuration, the power delivered need not exactly match, but deviations will average out.

As another example, consider the case of distributed power generation, where the machine is a set of generators at buildings, the loads are in the buildings, and the combiner is the power grid. The load in each building could be monitored via a respective sensor, and the controller can choose which of the generators to throttle to supply the loads. In this sense, the "difference" variable the controller can consider is the distance from the respective generator to the load.

More particularly, for teaching purposes, consider FIG. 1, which is a diagram representing an embodiment of a unit 99, in this case involving three or more generators 100. The generators 100 can, but need not include a Bloom Energy ES-5400 Energy Server. The generators 100 are controlled by a controller 101. The controller 101 can, but need not, be a computer, as discussed subsequently with respect to FIG. 8. The controller 101 is running or operating according to an algorithm that throttles the generators 100 to match or control the load or loads 103. The outputs of the generators 100 can be combined with a combiner 102.

The combiner 102 can, but need not, be a conductor (if the generators produce exactly the type of electrical power that the load requires) or a power converter such as an inverter. Power flow can be controlled by the controller 101 and in some embodiments, by using one or more power sensor(s) 105), e.g., meter(s). Depending on the configuration desired, there can be only sensor 105, but in any case, an indication or indications of monitored power delivered to the load or the loads is communicated to be received by the controller.

In some implementations, a buffer 104 is located between the generators 100 and the load 103. The buffer 104 can, but need not, be ultracapacitors such as Maxwell Technologies' K2 series or a Beacon Power Smart Energy 25 Flywheel. In some embodiments the buffer 104 can be between the generator(s) 100 and the power combiner 102. If desired, a dummy load 106 can take up excess generated power that cannot be used by the load 103. The dummy load 106 can be such as to take up excess generating capacity (e.g., if the generators 100 cannot throttle to match the load exactly, or if the load decreases faster than the generators are throttled). In some embodiments, the dummy load 103 can provide energy to one or more generators 100 to "recycle" the energy, in a sense, a form of buffering. In some embodiments, the controller can receive input information from the dummy load and/or send control signals to the dummy load.

The power sensors 105 are unnecessary if the load 103 uses all the power that is generated, so that the load follows the generators 100. An example of this would be in a vehicle where the acceleration of the vehicle is changed by throttling the generator unit 99. Alternately, the power required by the load 103 could be controlled independent of the generator unit 99, in which case the generator unit 99 could sense the power being delivered to the load, e.g., by using a power sensor 105, and could throttle the generators 100 to match the required power.

The embodiment of the power combiner 102 can depend upon the type of power that is required by the load and the type of power that is produced by the generators 100. For example, if the generators 100 produce DC electrical power and the load 103 requires AC electrical power, the combiner 102 could be an inverter. Alternately, it might be preferred for each generator 100 to have its own inverter, in which case the power combiner 102 would be a conductor plus a controller to synchronize the inverters on each generator 100.

For loads less than the sum of the capacities of all the generators 100, the controller 101 can use an algorithm to select which generators 100 are on and which are throttled to less than full capacity (including which are fully throttled to off).

In some embodiments, the components that make up the unit 99 are not all at the same geographical location, so that the unit 99 is a logical unit rather than a physical unit. For example, the generators 100 could be located at individual buildings that contain loads 103, with the combiner 102 being an electrical grid connecting the generators 100. The controller 101 could be a number of computers networked together that monitor the loads 103 and cooperatively control the generators 100.

Figure 2:
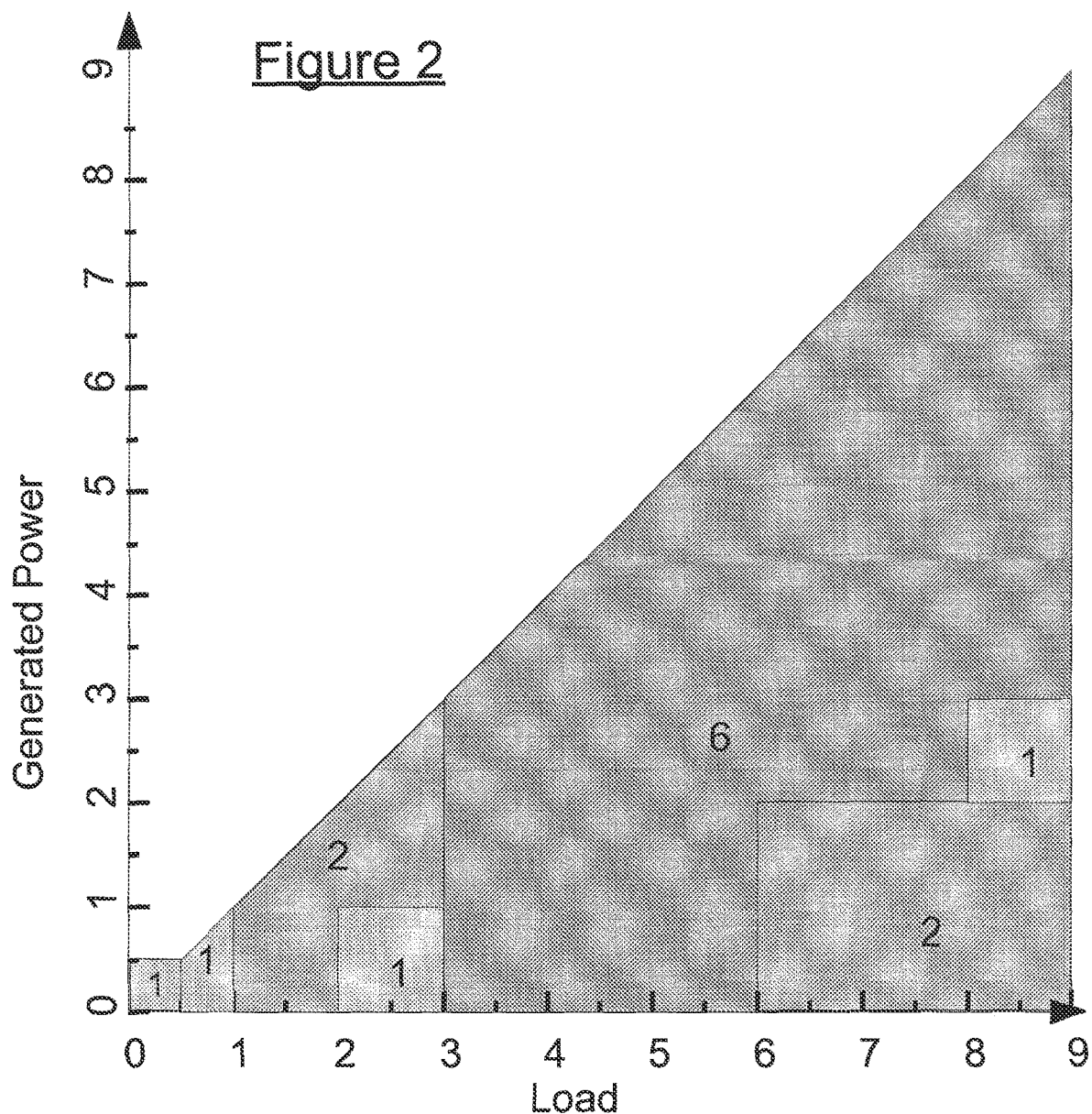
FIG. 2 illustrates an algorithm for an embodiment with three generators each of which can be throttle to half of the generator's capacity.

FIG. 2 illustrates an example algorithm for how three generators 100, i.e., 1, 2, and 6, with respective capacities 1, 3, and 6 units (respectively), each being throttlable to 50% of capacity, can be controlled to generate any output between 0.5 and 9.0 units. The generating capacity could be increased to 27 units by adding a fourth generator with a capacity of 18 units. Additional units could be added to increase the generating capacity without limit.

Figure 3:
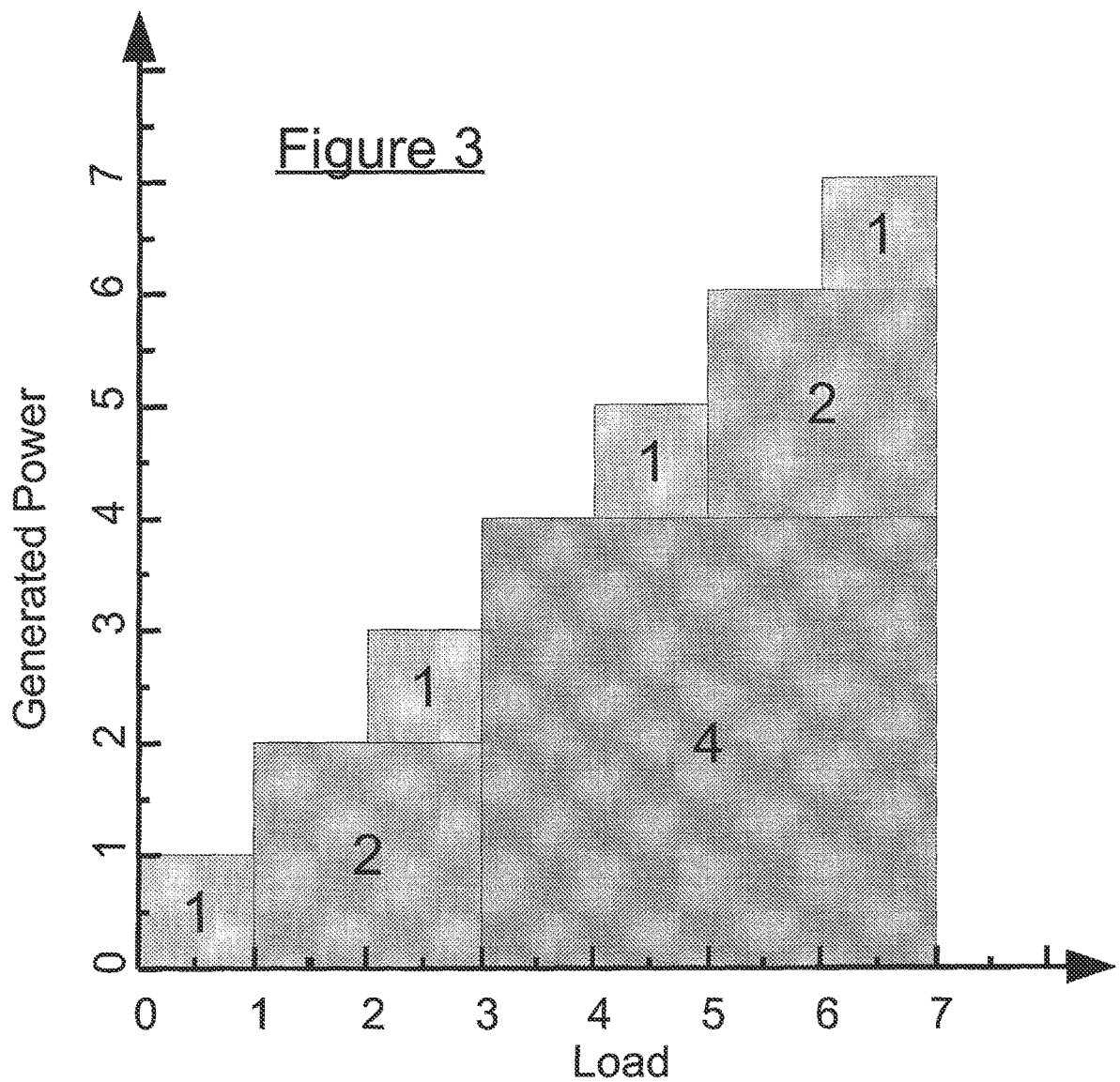
FIG. 3 illustrates an algorithm for another embodiment with three generators, each of which can be throttled by turning the generator off.

FIG. 3 illustrates an example algorithm for how three generators 100, i.e., 1, 2, and 4 with capacities 1, 2, and 4 units (respectively), each being either on or off, can be used to generate power in integral units up to 7 units. Adding a fourth generator with a capacity of 8 units would allow for power to be generated in any integer unit up to 15 units. Additional generators could be added following the binary sequence $2^N$ to increase the generating power to larger integer units. An optional dummy load could be used to match an integer-generated power to a non-integer load.

Figure 4:
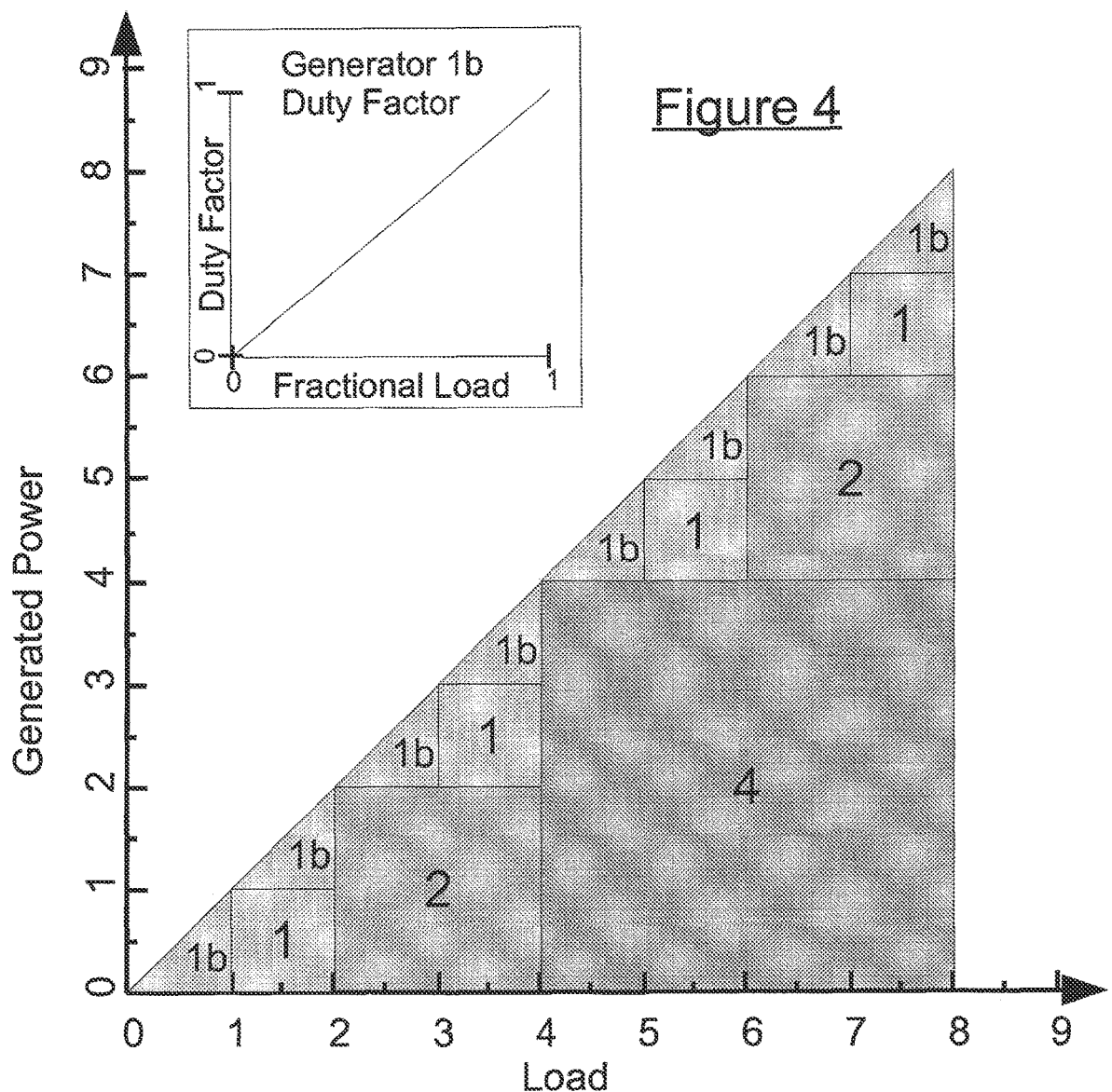
FIG. 4 illustrates an algorithm for yet another embodiment with four generators plus a buffer.

FIG. 4 shows an example algorithm for how four generators 100, i.e., 1b, 1, 2, and 4 with capacities 1, 1, 2, and 4 units (respectively), each being either on or off, can be used to generate power up to 8 units. These four generators can be used to generate up to 8 units of power, and additional generators could be added following the binary sequence $2^N$ to increase the generating power to larger integer units. These generators could be used with a buffer (104 in FIG. 1) to match non-integer loads, with generator 1b cycled on and off with a duty factor determined by the non-integer load as shown in the insert.

FIG. 5 illustrates an example algorithm for how three generators 100, i.e., 1, 2, and 6, with respective capacities 1, 3, and 6 units (respectively), each being throttlable to 50% of capacity, can be controlled to generate any output between 0.5 and 9.0 units. This is similar to the example algorithm illustrated in FIG. 2 with the exception that here the generators with lower capacity have lower operating costs, so they are run in preference to the generators with higher capacity and higher operating costs.

FIG. 6 illustrates an algorithm for managing the maintenance schedule for the generators. The algorithm illustrated on the top plot is for an embodiment with three generators 100, i.e., 1, 2, and 3, where all the generators will have similar operating times so that they can be maintained at the same time.

FIG. 7 illustrates an algorithm for an embodiment with three generators where the generators are operated in order that only one generator reaches its maintenance life at a time.

FIG. 8 illustrates an algorithm for an embodiment with at least two generators 100, i.e., 1 and 2 where generator 1 can change its output faster than generator 2. Generator 1 would typically be operated at less than its full capacity, and it would track changes in the load (either increasing or decreasing) while generator 2 would be throttled at a slower rate to keep generator 1 as close to its nominal intermediate operating level as possible.

Turning now to FIG. 8, controller 101 can be a computer, e.g., a digital electrical computer. A "computer," as used herein, can be viewed as at least one computer having all functionality or as multiple computers with functionality separated to collectively cooperate to bring about the functionality. Embodiments of herein may be implemented in hardware or software, or a combination of both. Thus, computer aspects can be implemented on one or more general purpose computers or specialized devices or both, and can operate electrically, optically, or in any other fashion, but generally, a computer system can include any system that has one or more processors, such as, for example, a digital signal processor (DSP), a microcontroller, an application-specific integrated circuit (ASIC), or a microprocessor. Logic flow can represent signal processing, such as digital data processing, including transformation of electrical signals, by logic flow or logic means—implemented in discrete circuits, programmed computer, or an equivalent.

Embodiments including software or one or more programs may be implemented as one or more computer programs executing on programmable systems comprising at least one processor, a data storage system (including volatile and non-volatile memory and/or storage elements), at least one input device, and at least one output device. Program code may be applied to input data to perform the functions described herein and generate output. The output may be applied via one or more output devices. The program(s) may be implemented in a high level procedural or object oriented programming language to communicate with a processing system. The program(s) may also be implemented in assembly or machine language, if desired. In fact, the embodiments are not limited in scope to any particular programming language. In any case, the language may be a compiled or interpreted language.

The program(s) may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments may also be considered to be implemented as a machine-readable storage medium, configured for use with a computer system, where the storage medium so configured as to cause the computer system to operate in a specific and predefined manner to perform the functions described herein. Thus, computer-readable media, as used herein, can comprise at least one of a RAM, a ROM, a disk, an ASIC, a FPGA, and a PROM, and may comprise a non-transient media.

Figure 9:
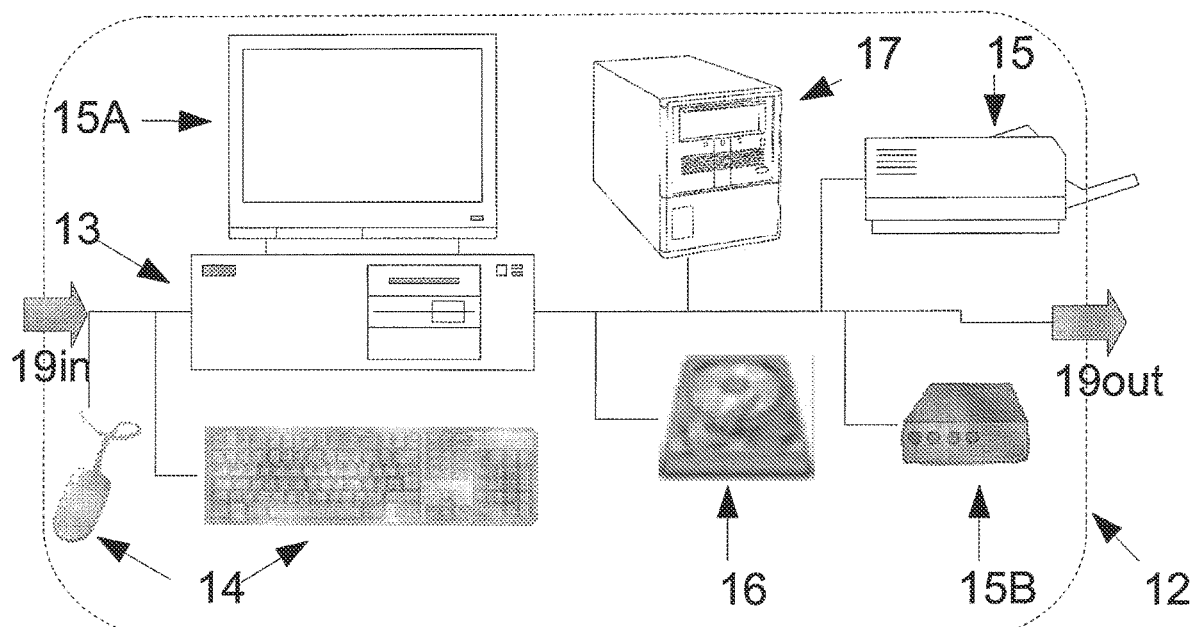
FIG. 9 illustrates an embodiment of a controller.

Industrial or technical applicability is clear from the description. More particularly, there can be a computer 12, (e.g., illustrated in FIG. 9 in the context of a computer system such as an IBM, Hewlett Packard, or other personal computer with input and output devices, but a computer system can have any or all of the components depending on the embodiment at issue). Computer 12 can have one or more processors 13 (e.g., an Intel or AMD series processor or the like), a memory 16 (e.g., a hard drive, disk drive, etc.), computer readable medium 17, an input device 14 (e.g., keyboard, mouse, modem 15B, or the like), and one or more output devices 15 (e.g., a Hewlett Packard printer 15, a Dell monitor 15A, a modem 15B, or other such output device). Note that the modem 15B is representative of a computer-to-computer communication device that can operate as an input/output device. As a controller 101 for this embodiment, the computer system 12 would send control signals 19 out to generators 100 and optionally buffers 104 and dummy loads 106, and would optionally receive 19 in signals from generators 100, buffers 104, dummy loads 106, and power sensors 105.

Depending on the embodiment desired, the computer 12 can communicate with one or more other computers, which can, but need not, be an equivalent computer or computer system with respect to computer or computer system 12.

Computer system 12 can implement one or more algorithms, such as those shown in FIGS. 2-8, the algorithms which may (if so desired) be incorporated in computer-readable program of instructions executable by a computer to carry an embodiment, for example, as follows: FIG. 2 shows how three generators 100, i.e., 1, 2, and 6 with relative capacities 1, 2, and 6 respectively, each of which could be throttled to half of its generating capacity, could be used to match any load up to the sum of the generating capacity of all the generators 100. The particular algorithm can be implemented in a more complex manner, for example, to minimize operating costs (the costs of fuel, maintenance, and any other costs that are accrued as a function of the amount of power generated). The algorithm shown in FIG. 2 would minimize operating costs if the larger of the generators 100 had lower operating costs than the smaller of the generators 100. The algorithm shown in FIG. 5 would minimize operating costs if the smaller generators had lower operating costs than the larger generators. FIG. 3 shows the algorithm that could be used for an embodiment of three generators 100, i.e., 1, 2, and 4 with generating capacities 1, 2, and 4, respectively, and which could only be throttled by turning the generators on or off. This algorithm minimizes the amount of power generated in excess of what is needed to meet the required load. FIG. 4 shows an algorithm for a similar embodiment that adds a fourth generator 1b with a buffer, so that the generated power matches the load with no excess power generated.

FIG. 6 illustrates an algorithm for controlling an embodiment with three generators 100, each of which requires maintenance after 3 units of time. The algorithm keeps the total operating time of each of the three generators 100 nearly the same, so that all the generators will need maintenance at approximately the same time.

FIG. 7 illustrates an algorithm for controlling an embodiment with three generators 100. The algorithm results in staggered maintenance, so that only one generator requires maintenance at a time, and that one can be taken out of service for maintenance while the other generators provide power for the load.

FIG. 8 illustrates an algorithm for an embodiment with at least two generators 100, i.e., 1 and 2 where generator 1 can change its output faster than generator 2. Generator 1 would typically be operated at less than its full capacity, and it would track changes in the load (either increasing or decreasing) while generator 2 would be throttled at a slower rate to keep generator 1 as close to its nominal intermediate operating level as possible.

In some, but not all, embodiments, the algorithm can use the difference between the generators 100 in selecting which generator(s) to throttle. Consider the sample algorithms presented here to see that there can be a list of generators 100 that is sorted by the difference (efficiency, size, whatever). There can be an iterator that is used to loop through the generators 100 in order to throttle them. The details of how this is used depend upon which difference(s) at issue in a particular implementation. For example, the more efficient of the generators 100 will be used first, if this is the implementation desired. When the difference is response speed, the fastest generator 100, i.e., 1 in FIG. 8, will typically be throttled to an intermediate output value (so it can go up or down quickly), and then changes would be tracked with the slower of the generators 100, i.e., 2 in FIG. 8, as much as possible, changing the fastest of the generators 100, i.e., 1 only when necessary and always using the slower of the generators 100, i.e., 2 to try to bring the fast generator 100, i.e., 1 back to it's set point.

For further teaching purposes, the following are examples of algorithm fragments that can be employed by controller 101 in some embodiments. These examples are intended to show some, but not necessarily all, of the possible inputs, calculated values, and conditional tests that could be used for controlling the generators. These examples are not intended to be in any particular computer language, but rather to serve as guides showing how some algorithms could be structured to accomplish particular purposes. Some details have been omitted, particularly if they depend upon the specifics of a particular embodiment.

An example of an algorithm for handling fuel cost.
Input FuelCost;
Input NGen; number of generators
Input MaxKW(NGen); generating capacity of each generator
Input MinKW(NGen); generating capacity of each generator when fully throttled (=MaxKW for generators that are only on-off)
Input FuelPerKWH(NGen); fuel efficiency for each generator (may be a function of generator's output when throttled)
Input MaintPerKHW(NGen); maintenance cost for each generator
Function TurnOn[Gen]; turns on generator Gen
Function Throttle[Gen]; throttles generator Gen
Function GenOutput[Gen]; gets current output for generator Gen
Input OpLife(NGen); Operational life remaining for each generator before maintenance is scheduled
Input SlewRate(NGen); rate each generator can change output
Input BufferKWH; size of energy buffer
Input Gen2Use4Charging; generator used to charge buffer
Function TurnOnBuffer[]; turns the energy buffer on
Input DummyLoadKW; size of dummy load
Function TurnOnDummyLoad[]; turns on the dummy load
Example Subroutine to turn on most efficient generator(s) to match load:
Calculate CostPerKWH(NGen)=(FuelCost*FuelPerKWH(NGen)+MaintPerKWH(NGen));
Sort UseFirst(NGen) by CostPerKWH(NGen); determine which generators to run first
Read Current Load; could be from a load sensor or an input such as an accelerator pedal
Load2Meet=CurrentLoad;
Iterator Gen2Use=UseFirst;
TestGen: If Load2Meet>MinKW(Gen2Use) then TurnOn[Gen2Use];
Else increment Gen2Use and If Gen2Use exists go to TestGen Else go to LoadTooSmall;
If Load2Meet<MaxKW(Gen2Use) then Throttle[Gen2Use] to Load2Meet;
Else Throttle[Gen2Use] to MaxKW(Gen2Use);
Reduce Load2Meet by GenOutput[Gen2Use];
If (Load2Meet==0) then go to Wait4Load2Change;
Else increment Gen2Use and If Gen2Use exists go to TestGen Else go to LoadTooSmall;
LoadTooSmall: Example Subroutine for dealing with loads less than the lowest generator's throttled capacity (uses buffer)
TurnOnBuffer[]; turn the buffer on
Calculate dutycycle=Load2Meet/MaxKW(Gen2Use4Charging);
TurnOn[Gen2Use4Charging, dutycycle]; set the duty cycle of the generator that will charge the buffer
LoadTooSmall: alternate Example Subroutine for dealing with loads less than the lowest generator's throttled capacity (uses dummy load)
Calculate Mincost(NGen)=CostPerKWH(NGen)*MinKW(NGen);
Sort UseWhenSmall(NGen) by lowest MinCost(NGen);
Iterator Gen2Use=UseWhenSmall;
TestGen4Dummy: DummyLoad=MinKW(Gen2Use)−Load2Meet; calculate excess generating capacity
If (DummyLoad<DummyLoadKW) then TurnOn[Gen2Use] and TurnOnDummyLoad[DummyLoad];
Else increment Gen2Use and If Gen2Use exists go to TestGen4Dummy;
Else generate error: no generator works with this load; (this error should never happen for a well-designed system)

An example of an algorithm for ensuring that a plurality of generators will be in need of maintenance at about the same time.
Input MaxLifeDifference; try to keep remaining operating lifetimes the same to within this maximum difference
RunGenWithMostLife:
Sort GenByLife by maximum OpLife(NGen);
Iterator Gen2Use=GenByLife; select generator to use with most life left
If (OpLife(Gen2Run)==0) then generate message "Time for maintenance" and quit;
Time2Run=OpLife(Gen2Use)−OpLife(next[Gen2Use])+ MaxLifeDifference; determine how long to run this generator to reach maximum lifetime difference
If (Time2Run>OpLife(Gen2Use)) then Time2Run=OpLife (Gen2Use); do not run generator past its operational lifetime
TurnOn(Gen2Use); turn on the generator with the most life remaining
Wait(Time2Run); operate generator for specified length of time
Reduce OpLife(Gen2Use) by Time2Run; keep track of remaining lifetime
TurnOff(Gen2Use);
Go To RunGenWithMostLife: select next generator and run it An example of an algorithm for ensuring that for a plurality of generators, most will have a maximum operational life remaining when one generator is in need of maintenance.
Function Name[]; output name of generator for message
RunGenWithLeastLife:
Sort GenByLife by minimum OpLife(NGen);
Iterator Gen2Use=GenByLife; select generator to use with least life left
If (OpLife(Gen2Run)==0) then generate message "Time for maintenance" and quit;
Time2Run=OpLife(Gen2Use); determine how long to run this generator to reach its operational lifetime
TurnOn(Gen2Use); turn on the generator with the least life remaining
Wait(Time2Run); operate generator for specified length of time
Reduce OpLife(Gen2Use) by Time2Run; keep track of remaining lifetime
TurnOff(Gen2Use);
Generate message "time to maintain generator" Name [Gen2Use];
Go To RunGenWithLeastLife: select next generator and run it An example of a slewing algorithm
(Again this is not a complete program, but it teaches setting generators for a base load, setting the fastest generator to its midpoint, and then matching the current load with slow generators. Then there is a loop that reads the load's slewing rate and matches this with generators. (A more complete algorithm would include more error checking to make sure the unit has not run out of generators, would include knowing when generators have slewed to their limit and switching to another generator, and would distinguish between positive and negative slewing, etc.)
Input NGen; number of generators
Input MaxKW(NGen); generating capacity of each generator
Input MinKW(NGen); generating capacity of each generator when fully throttled
Input SlewRate(NGen); rate output can change for each generator (may be a function of generator's output when throttled; may differ for increasing or decreasing power)
Input Baseload; minimum load ever required
Function TurnOn[Gen]; turns on generator Gen
Function Throttle[Gen,Rate]; throttles generator Gen at Rate
Function GenOutput[Gen]; gets current output for generator Gen
Example Subroutine to throttle generators at the proper slewing rate:

```
Sort Slowest(NGen) by SlewRate(NGen); determine which generators slew
      slowest (secondary considerations can also be used to set order)
Iterator Gen2Use = Slowest; use slowest generator for Baseload
Load2Meet = Baseload;
TestBase: if (MinKW(Gen2Use) < Load2Meet)
then {
        If (MaxKW(Gen2Use) > Load2Meet)
        Then{ TurnOn[Gen2Use] to Load2Meet }
        Else { TurnOn[Gen2Use] to MaxKW{Gen2Use}
        Reduce Load2Meet by GenOutput{Gen2Use}
      }
Increment Gen2Use;        choose next slowest generator
 If (Load2Meet > 0) and (Gen2Use does not exist)
Then generate error message and quit; cannot happen for a well-designed
system
If (Load2Meet > 0) then go to TestBase;   keep turning on slowest
generators until baseload is met
Read CurrentLoad;          could be from a load sensor or an input such as an
       accelerator pedal
Load2Meet = CurrentLoad − Baseload;
; If possible, set fastest slewing generator to intermediate power level so it has room to
       slew up or down
Logical SetFastest = true;
Iterator Gen2Use = Last[Slowest];   fastest generator
FastestSetPoint = MinKW(Gen2Use) + (MaxKW(Gen2Use) −
       MinKW(Gen2Use))/2;
SetPoint = FastestSetPoint;
TestGen: If (Load2Meet > MinKW(Gen2Use))
then {if (Load2Meet > SetPoint)
    then TurnOn[Gen2Use] to SetPoint;
    Else {TurnOn[Gen2Use] to Load2Meet];
    Reduce Load2Meet by GenOutput[Gen2Use];
    }
```

```
if (Load2Meet > 0)
then {
        if (SetFastest)        ;     this is the first time thru
        then { Gen2Use = Slowest;
             while (GenOutput[Gen2Use] == MaxKW(Gen2Use))
                            Increment Gen2Use;  point to slowest
             generator with spare capacity
             }
        Else Increment Gen2Use;
    SetPoint = MaxKW(Gen2Use); slower generators full on if possible
    go to Test Gen;         keep turning on generators until load is met
    }
; load is met, so now track it:
TrackLoad:
Read LoadSlewRate;
SlewRate2Meet = LoadSlewRate;
Iterator Gen2Use = Slowest;
while (GenOutput[Gen2Use] == MaxKW(Gen2Use))
     Increment Gen2Use;   point to slowest generator with spare
         capacity
MatchSlewRate:
If (SlewRate2Meet != 0)
Then  {
        If (SlewRate2Meet < SlewRate(Gen2Use))
        Then Slew2Use = SlewRate2Meet;
        Else Slew2Use = SlewRate(Gen2Use);   maximum slew rate
        Throttle[Gen2Use, Slew2Use];    follow load with this generator
        Reduce SlewRate2Meet by Slew2Use;
    }
If (SlewRate2Meet == 0);   OK, so wait, check again
        Wait[CheckInterval] and go to TrackLoad;
Else Increment Gen2Use and go to MatchSlewRate;
```

Another algorithmic approach is to use an algorithm which learns from use of the unit 99, which is described in its simplest case of being applied to one generator, though extension to the generators 100 of a unit 99 is to be understood. Illustratively, then, consider such an adaptive algorithm in a method for operating a hybrid motor vehicle to optimize efficiency, range, performance, and/or other operating characteristics. The vehicle can comprised at least one electrical energy storage system, at least one electrical energy generating system (which could be such as a unit 99 described herein), an electrically powered propulsion system, and a controller programmed to adaptively control which power source(s) provide electrical energy to the propulsion system of the vehicle at any given moment and when to divert the power, e.g., to charge the electrical storage system(s) using the electrical energy generating system(s). The method illustrative can include: measuring an amount of stored energy in the storage system(s); projecting an amount of energy needed along the route using historical information from previous trips, information about current conditions, and/or maps; optimizing energy balance between the energy storage system(s) and the energy generating systems; controlling the charge state of the energy storage system(s) and throttling the energy generating system(s); recording energy load requirements along the route as a function of location and/or current conditions. Information from previous trips can either be local to this vehicle or crowd-sourced using telemetry from other vehicles, etc. Of course, the use of this vehicle is really only to teach a concept applicable to other loads, and similarly, the algorithm can be applied to multiple generators 100 with different efficiencies or other differences, as discussed above. Similarly, there can be multiple energy storage systems with different characteristics (maximum current, capacity), such as ultracapacitors; batteries, etc.

Algorithms herein, such as the "learning algorithm" can also be adapted to account for current conditions, such as traffic, weather, speed, acceleration, time of day, vehicle loading, etc. And implementations can, if so desired, record telemetry along common routes in order to customize vehicle's power systems for optimum performance. Any of the embodiments herein can be combined, for example, the "learning algorithm" system can also incorporate the above-described embodiments with modular components that can be swapped, and correspondingly, other components can be modularly swapped, e.g., more battery for less capacitor, or higher efficiency generators for less expensive lower efficiency generators, etc., and the controller receive input indicative of the swapping, if the swapping is significant for the algorithmic controlling.

The unit 99 can be adapted to reside in or adjacent, or otherwise provide electrical power, to a vehicle, car, truck, motor home, single residential building, industrial facility, or a load defined by a device, e.g., an air conditioner. The fuel for such a unit could be natural gas, propane, a liquid fuel such as heating oil or gasoline, or a solid fuel such as coal. The electrical power can be such as to propel the vehicle, car, truck, motor home, etc. by means of an untraditional fuel for the vehicle. For example, the unit 99 can propel a car by using a fuel that is not combustible, e.g., not gasoline, not diesel.

Embodiments can be configured such that the unit 99 and/or generators 100 have no revolving component, e.g., no revolution as between a magnetic field and a conductor, although a revolving component may be used to supply fuel, air, and/or cooling, etc, for the unit 99 and/or generators 100. Embodiments can be configured such that the unit 99 and/or generators 100 make no sound within the human-audible range, as with solar cell generators 100. Similarly, though, such sound may be produced in the supplying of the fuel and/or cooling, etc. Embodiments can be configured such that the unit 99 and/or generators 100 are devoid of one type of the above-identified energy sources, and/or are devoid of direct or indirect conversion, e.g., devoid of direct conversion of mechanical energy nor chemical energy in the conversion from another form of energy into electrical energy—again except for supplying of the fuel, air, and/or cooling, etc. Embodiments can be configured such the unit 99 and/or generators 100 have no moving parts (such as brushes) used to generate the electrical power, although moving parts may be used to supply fuel, air, and/or cooling. Embodiments can be configured where there is no exhaust emitted by the unit 99 and/or the generators 100, such as with a solar cell implementation. And similarly, again except for supplying of the fuel, air, and/or cooling, etc. Embodiments may analogously be configured such that the amount of wasted energy is below a certain specified range, such as less than 50%, 20%, 10%, as exemplified by some combined-cycle steam turbines, some fuel cells, and some water turbines, respectively.

In sum, appreciation is requested for the robust range of possibilities flowing from the teachings herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments which implement the general teachings are to be viewed as included herein because the disclosure herein has been described with reference to specific embodiments for teaching purposes, such that the disclosures are intended to be illustrative and are not intended to be limiting. Various modifications and applications may occur to those skilled in the art without departing from the true spirit and scope defined in the claims.

Thus, although only a few exemplary embodiments have been described in detail above, those skilled in the art will readily appreciate that many modifications are possible in the exemplary embodiments without materially departing from the novel teachings and advantages herein. Accordingly, it is respectfully requested that all such modifications be included within the scope defined by claims. In the claims, means-plus-function claims if any are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

We claim:

1. A machine which independently and cooperatively throttles each of a plurality of generators in combinatively supplying electrical power to a load or loads, the machine comprising:
    a plurality of generators, each of the generators having a capacity to produce electrical power, wherein
        the generators are joined or interconnected together so as to operate as a single unit,
        the generators use an energy source to each produce the electrical power, and
        at least two of the generators are each comprised of a hot emitter and a photovoltaic cell that converts emitted radiation from the hot emitter into said electrical power;
    a power combiner located to deliver the electrical power from the generators to one or more loads;
    an energy buffer positioned between at least one of the generators and said one or more loads; and
    a controller configured to implement an algorithm which independently and cooperatively throttles each of the generators in combinatively supplying the electrical power to the load or the loads.

2. A method of making a machine to combine power from generators to supply power to a load or loads, the method comprising:
    operably associating a plurality of generators, each of the generators having a capacity to produce electrical power, such that:
    the generators are joined or interconnected together so as to operate as a single unit,
    the generators use an energy source to each produce the electrical power, and
    at least two of the generators are each comprised of a hot emitter and a photovoltaic cell that converts emitted radiation from the hot emitter into said electrical power;
    locating a power combiner to deliver the electrical power from the generators to one or more loads;
    positioning an energy buffer between at least one of the generators and said one or more loads; and
    configuring a controller to implement an algorithm which independently and cooperatively throttles each of the generators in combinatively supplying the electrical power to the load or the loads.

3. A method of using a machine to combine power from generators to supply power to a load or loads, the machine comprising:
    producing electric power with a plurality of generators, each of the generators having a capacity to produce electrical power, wherein
        the generators are joined or interconnected together so as to operate as a single unit,
        the generators use an energy source to each produce the electrical power, and
        at least two of the generators are each comprised of a hot emitter and a photovoltaic cell that converts emitted radiation from the hot emitter into said electrical power;
    delivering the electrical power from the generators via a power combiner to one or more loads;
    implementing, by a controller an algorithm, which independently and cooperatively throttles each of the generators in combinatively supplying the electrical power to the load or the loads; and
    storing at least some of the electric power by using an energy buffer located between said at least one of the generators.

4. A method of using a machine to combine power from generators to supply power to a load or loads, the method comprising:
    operating a plurality of generators, each of the generators having a capacity to produce electrical power, such that:
    the generators are joined or interconnected together so as to operate as a single unit,
    the generators use an energy source to each produce the electrical power, and
    at least two of the generators are each comprised of a hot emitter and a photovoltaic cell that converts emitted radiation from the hot emitter into said electrical power;
    delivering, by a power combiner, the electrical power from the generators to one or more loads;

implementing, by a controller, an algorithm which independently and cooperatively throttles each of the generators in combinatively supplying the electrical power to the load or the loads; and storing at least some of the electric power by using an energy buffer located between said at least one of the generators.

5. The machine of claim 1, wherein the fuel to said at least two generators does not include gasoline or diesel fuel.

6. The machine of claim 1, wherein the fuel to said at least two generators is an energy source that is not combustible.

7. The machine of claim 1, wherein said generators are throttled by limiting an amount of the energy source, comprising the fuel, available to said at least two of the generators.

8. The machine of claim 1, wherein said hot emitter is composed of tungsten surrounded by argon gas.

9. The machine of claim 1, wherein said hot emitter has a surface temperature that is greater than or equal to 1700 degrees Kelvin.

10. The machine of claim 1, wherein said hot emitter has a surface temperature that is greater than or equal to 1700 degrees Celsius.

11. The machine of claim 1, wherein said hot emitter has a surface temperature that is greater than or equal to 2000 degrees Kelvin.

12. The machine of claim 1, wherein said hot emitter has a surface temperature that is greater than or equal to 2000 degrees Celsius.

13. A product produced by the method of claim 2.

14. The method of claim 2, wherein the fuel to said at least two generators does not include gasoline or diesel fuel.

15. The method of claim 2, wherein the fuel to said at least two generators is an energy source that is not combustible.

16. The method of claim 2, wherein said generators are throttled by limiting an amount of the energy source, comprising the fuel, available to said at least two of the generators.

17. The method of claim 2, wherein said hot emitter is composed of tungsten surrounded by argon gas.

18. The method of claim 2, wherein said hot emitter has a surface temperature that is greater than or equal to 1700 degrees Kelvin.

19. The method of claim 2, wherein said hot emitter has a surface temperature that is greater than or equal to 1700 degrees Celsius.

20. The method of claim 2, wherein said hot emitter has a surface temperature that is greater than or equal to 2000 degrees Kelvin.

21. The method of claim 2, wherein said hot emitter has a surface temperature that is greater than or equal to 2000 degrees Celsius.

22. The method of claim 3, wherein the fuel to said at least two generators does not include gasoline or diesel fuel.

23. The method of claim 3, wherein the fuel to said at least two generators is an energy source that is not combustible.

24. The method of claim 3, wherein said step of implementing includes throttling the generators by limiting an amount of the energy source, comprising the fuel, available to said at least two of the generators.

25. The method of claim 3, wherein said hot emitter is composed of tungsten surrounded by argon gas.

26. The method of claim 3, wherein said hot emitter has a surface temperature that is greater than or equal to 1700 degrees Kelvin.

27. The method of claim 3, wherein said hot emitter has a surface temperature that is greater than or equal to 1700 degrees Celsius.

28. The method of claim 3, wherein said hot emitter has a surface temperature that is greater than or equal to 2000 degrees Kelvin.

29. The method of claim 3, wherein said hot emitter has a surface temperature that is greater than or equal to 2000 degrees Celsius.

30. The method of claim 4, wherein the fuel to said at least two generators does not include gasoline or diesel fuel.

31. The method of claim 4, wherein the fuel to said at least two generators is an energy source that is not combustible.

32. The method of claim 4, wherein said step of implementing includes throttling the generators by limiting an amount of the energy source, comprising the fuel, available to said at least two of the generators.

33. The method of claim 4, wherein said hot emitter is composed of tungsten surrounded by argon gas.

34. The method of claim 4, wherein said hot emitter has a surface temperature that is greater than or equal to 1700 degrees Kelvin.

35. The method of claim 4, wherein said hot emitter has a surface temperature that is greater than or equal to 1700 degrees Celsius.

36. The method of claim 4, wherein said hot emitter has a surface temperature that is greater than or equal to 2000 degrees Kelvin.

37. The machine of claim 1, wherein the fuel to said at least two generators is coal.

38. The method of claim 2, wherein the fuel to said at least two generators is coal.

39. The method of claim 3, wherein the fuel to said at least two generators is coal.

40. The method of claim 4, wherein the fuel to said at least two generators is coal.

* * * * *